United States Patent
Yabe et al.

(10) Patent No.: US 6,743,099 B2
(45) Date of Patent: Jun. 1, 2004

(54) VIDEO GAME MACHINE, PLAYER CHARACTER ACTION CONTROL METHOD, AND VIDEO GAME PROGRAM

(75) Inventors: Makoto Yabe, Tokyo (JP); Hiroki Satoyoshi, Tokyo (JP); Yuji Kubo, Tokyo (JP)

(73) Assignee: Konami Corporation, Tokyo (JP)

( * ) Notice: Subject to any disclaimer, the term of this patent is extended or adjusted under 35 U.S.C. 154(b) by 252 days.

(21) Appl. No.: 10/051,978

(22) Filed: Jan. 29, 2002

(65) Prior Publication Data

US 2002/0119811 A1 Aug. 29, 2002

(30) Foreign Application Priority Data

Jan. 30, 2001 (JP) ..................................... P.2001-021697

(51) Int. Cl.⁷ ................................................ A63F 13/02
(52) U.S. Cl. ...................................................... 463/36
(58) Field of Search ...................... 463/1, 7–9, 36–38, 463/40–42; 273/148 R, 440, 459, 460, 461

(56) References Cited

FOREIGN PATENT DOCUMENTS

| EP | 1 048 330 A2 | 11/2000 |
|----|--------------|---------|
| JP | 8-280933 | 10/1996 |

OTHER PUBLICATIONS

Japanese Abstract No. 2000325660, dated Nov. 28, 2000.
Japanese Abstract No. 10305171, dated Nov. 17, 1998.

*Primary Examiner*—Mark Sager
(74) *Attorney, Agent, or Firm*—Sughrue Mion, PLLC (57) ABSTRACT

A plurality of player characters are displayed simultaneously. Switches including at least one of a plurality of orientation input means are assigned to the respective player characters. At least one of the plurality of player characters has a first mode in which the player character operates in accordance with inputs made by the switches assigned to the player character, and a second mode in which the player character operates in accordance with a predetermined subprogram. Switching between the first and second modes is effected when there is performed input operation by any one of switches assigned to the player characters.

21 Claims, 11 Drawing Sheets

VIDEO GAME MACHINE, PLAYER CHARACTER ACTION CONTROL METHOD, AND VIDEO GAME PROGRAM

BACKGROUND OF THE INVENTION

The present invention relates to control of a character which appears in a video game and is to be manipulated by a player (hereinafter called a "player character"), particularly to control of a plurality of player characters displayed simultaneously.

Many existing video games involve manipulation of a team or party consisting of a plurality of player characters. In such a related-art video game, there is defined a switch to be used for selecting a character which is an object of manipulation. A player character which is an object of operation is switched in accordance with an input from the switch. Here, player characters which are not objects of manipulation are left as they are or deactivated. In such a video game, the player characters which have been left do not take any action. Therefore, such player characters are unsuitable for a video game that is intended to have a somewhat real-time characteristic.

In order to solve such a problem, Japanese Patent Application Laid-Open No. 280933/1996 proposes a technique in which a switch to be used for selecting a character which is an object of manipulation is defined, a player character which is an object of manipulation is switched in accordance with an input from the switch, and player characters which have not been selected as objects of manipulation are automatically controlled.

However, the technique described in Japanese Patent Application Laid-Open No. 280933/1996 fails to enable a player to simultaneously operate a plurality of player characters. Therefore, the player cannot operate all the player characters at will. Difficulty is encountered in setting a game problem which can be solved only when a plurality of player characters are activated simultaneously.

According to the technique described in Japanese Patent Application Laid-Open No. 280933/1996, a player character which is an object of manipulation cannot be changed unless a predetermined key input is performed. In short, there is a necessity for the player performing an extra operation at the time of changing of a player character which is an object of manipulation. Therfore, such a technique is not suitable for a video game, such as in a so-called action game designed to have a strong real-time characteristic.

SUMMARY OF THE INVENTION

The present invention has been conceived under the foregoing conditions and is aimed at providing a player character action control method, a video game program, and a video game machine, which enable a player to manipulate a plurality of player characters simultaneously and obviate a necessity of the player deliberately switching a player character which is an object of manipulation.

Another object of the present invention is to provide a player character action control method, a video game program, and a video game machine, which set a problem which can be solved only when a plurality of player characters are actuated simultaneously.

Another object of the present invention is to provide a player character action control method, a video game program, and a video game machine, which can specify an object for which a player character is to act even when the player character is automatically controlled.

To solve the problems, the present invention provides a video game machine, a player character action control method, and a video game program.

The present invention provides a video game program to be executed by a video game machine which enables connection of a controller having a plurality of orientation input means, the method comprising the steps of:

simultaneously displaying a plurality of player characters; and assigning switches including at least one of the orientation input means to the respective player characters, wherein at least one of the plurality of player characters has a first mode in which the player character operates in accordance with inputs made by the switches assigned to the player character, and a second mode in which the player character operates in accordance with a predetermined sub-program; and switching between the first and second modes when input operation is performed by way of any one of switches assigned to the player characters.

According to the video game program, when switching is made from the first mode to the second mode, there is no necessity of the player pressing a special switch. Therefore, switching between modes can be effected smoothly.

Here, the sub-program takes, as an object of action, a non-player character located closest to the player character serving as an object of control.

Preferably, in the first mode there may be detected a non-player character located in a direction which is entered by the orientation input means assigned to the player character, and in the second mode the detected non-player character may be taken as an object of action for the player character. For example, the player specifies a target, and semi-automatic control of the sub-character can be effected.

Preferably, a non-player character may take one of the player characters located closest to the non-player character as an object of action.

Preferably, the action means actions to be performed by the non-player character, e.g., approaching action, battle action, and conversation.

Preferably, at least one of the plurality of player characters acts in accordance with only an input entered by the assigned switches. For example, one of player characters is taken as a main character, and the main character is designed so as to act in accordance with an input entered by switches assigned to the main character. Another one of the player characters can be controlled semi-automatically.

As an example of a non-player character suitable for use with such a video game program, there is a non-player character which completely prevents attack in one direction.

Preferably, as effective elements in the video game, there are provided a plurality of switches which are to be actuated by the player characters and make a predetermined response when simultaneously actuated by the player characters. For example, the switches are turned on when the player characters step on the switches.

Moreover, there can be provided a video game machine which operates in accordance with a video game program. Preferably, the video game machine further comprises a controller having a plurality of orientation input means.

Further, the present invention provides a player character action control method and a video game machine which provide the same advantage as that provided by the video game program.

DETAILED DESCRIPTION OF PREFERRED EMBODIMENTS (1) Constitution of Typical Video Game Machine A video game machine 100 suitable for running a video game program according to the present invention will be described. The video game machine 100 loads a program and data stored in a recording medium, such as an optical disk, and outputs images and sound to a player. The player can play a game by entering instructions by way of a controller.

Figure 1:
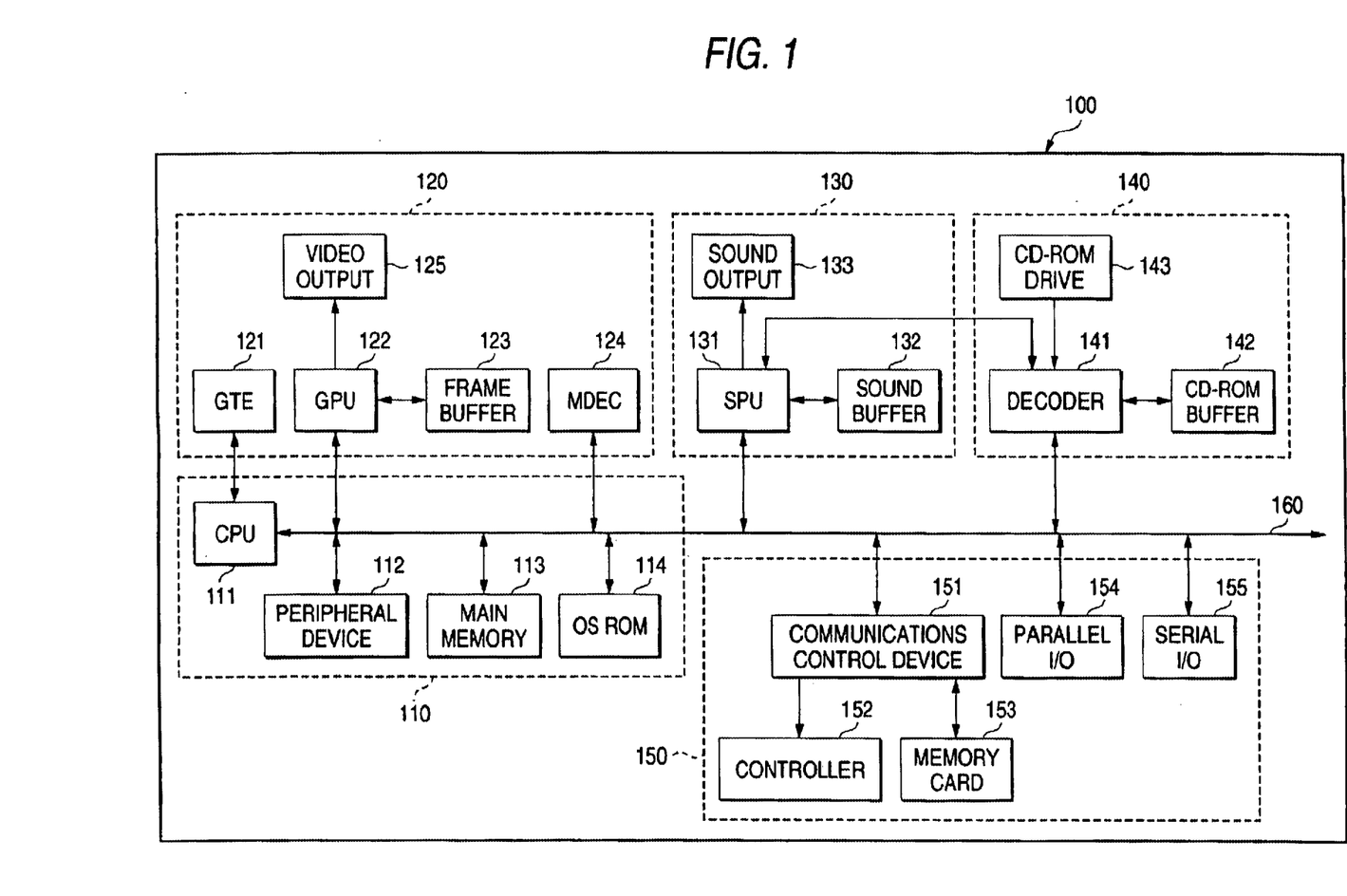
FIG. 1 is a block diagram showing a video game machine suitable for use with a video game program according to the present invention.

The configuration of the video game machine 100 will now be described with reference to FIG. 1. The video game machine 100 comprises a control section 110 for controlling the operation of the overall game machine 100; an image processing section 120 for performing processing pertaining to image display; a sound processing section 130 for performing processing pertaining to sound output; an auxiliary storage control section 140 which loads a program and data from a recording medium; a communications control section 150 for controlling input and output of other data; and a main bus 160 for interconnecting the control section 110, the image processing section 120, the sound processing section 130, the auxiliary storage control section 140, and the communications control section 150.

The internal configuration of the video game machine 100 from the control section 110 to the communications control section 150 will now be described.

The control section 110 comprises a CPU 111; a peripheral device controller 112; a primary storage device (main memory) 113 formed from RAM; and ROM 114. The peripheral device controller 112 effects an interrupt control operation, a time control operation, a memory control operation, and transfer of direct memory access (DMA). The ROM 114 stores a program, such as an operating system (OS) for managing the main memory 113, the image processing section 120, and the sound processing section 130. The CPU 111 controls the overall video game machine 100 by running the OS stored in the ROM 114. The CPU 111 is equipped with an instruction cache and scratch pad memory and manages actual memory.

The image processing section 120 comprises a geometry transfer engine (GTE) 121 formed from a coordinate computation coprocessor for effecting processing, such as coordinate conversion processing; a graphics processing unit (GPU) 122 for effecting a rendering operation in accordance with a rendering instruction output from the CPU 111; a frame buffer 123 for storing an image rendered by the GPU 122; an image decoder (MDEC) 124 for decoding image data which have been encoded through orthogonal transformation, such as so-called discrete cosine transformation and compressed; and video output means 125 such as a display device.

The sound processing section 130 comprises a sound reproduction processor (SPU) 131 for emitting sound; a sound buffer 132 for storing sound read from a CD-ROM, musical data, or sound source data; and sound output means 133, such as an amplifier and speaker for outputting sound produced by the SPU 131.

The auxiliary storage device control section 140 comprises a CD-ROM drive unit 143 for reproducing a program or data recorded on a CD-ROM disk; a decoder 141 for decoding a program or data which are recorded along with, e.g., an error correction code (ECC); and a CD-ROM buffer 142 for temporarily storing reproduction data output from the CD-ROM drive unit 143.

The communications control section 150 comprises a communications control device 151 for effecting communication control with the CPU 111 via the main bus 160; a controller 152 for entering an instruction from a user; a memory card 153 for storing settings of a game; a parallel I/O port 154 connected to a main bus 160; and an asynchronous serial I/O port 155 connected to the main bus 160.

The outline of operation of the video game machine 100 will now be described.

When power of the video game machine 100 is turned on, the OS stored in the ROM 114 is run by the CPU 111. The image processing section 120 and the sound processing section 130 are controlled under the OS. After performing initialization of the entire game machine 100, such as operation check, the OS controls the auxiliary storage control section 140 and runs a program recorded on a CD-ROM, such as a game. Then, in accordance with the implemented program and input of an instruction byway of the controller 152, the CPU 111 controls the image processing section 120 and the sound processing section 130. The video output means 125 displays an image, and the sound output means 133 outputs sounds, such as sound effects or music. The video game program according to the present invention is run by the video game machine 100 as a program to be loaded from the CD-ROM drive 143.

Input devices of the controller 152 will now be described with reference to FIG. 2. The controller 152 has the following switches. Orientation levers 201 and 202 input orientation commands in accordance with a direction in which these levers 201 and 202 are tilted, and these levers are used primarily for inputting orientation. Switches 203 to 212, a select switch 213, a start switch 214, and an analog/digital changeover switch 215 are press button switches. Of these switches, the start switch 214 is used primarily for activating a primary section of the video game from a menu appearing at the initiation of a video game program. The analog/digital changeover switch 215 switches to output a result of operation of the orientation levers 201 and 202 as an analog signal or a digital signal. A cable 216 connects the controller 152 to the video game machine 100.

(2) Video Game

An action game of quarter view display is described as an embodiment of a video game program according to the present embodiment. One main character A (designated by A in the drawings) and one sub-character B (designated by B in the drawings) appear as player characters in the video game. The main character A requires player's manipulation at all times. If the player performs no manipulation, the main character A does nothing. A screen of the video game is always displayed at the center of the main character A. In contrast, the player can manipulate the sub-character B to a certain extent. However, even when the player does not perform manipulation at all, the sub-character B acts in accordance with a predetermined algorithm set previously in the video game program. In addition to the player characters, opponents (designated by C1, C2, C3, and C4 in the drawings) of non-player characters appear in the game. Actions of the opponent characters are not susceptible to the player's manipulation and act in accordance with a predetermined algorithm.

Figure 2:
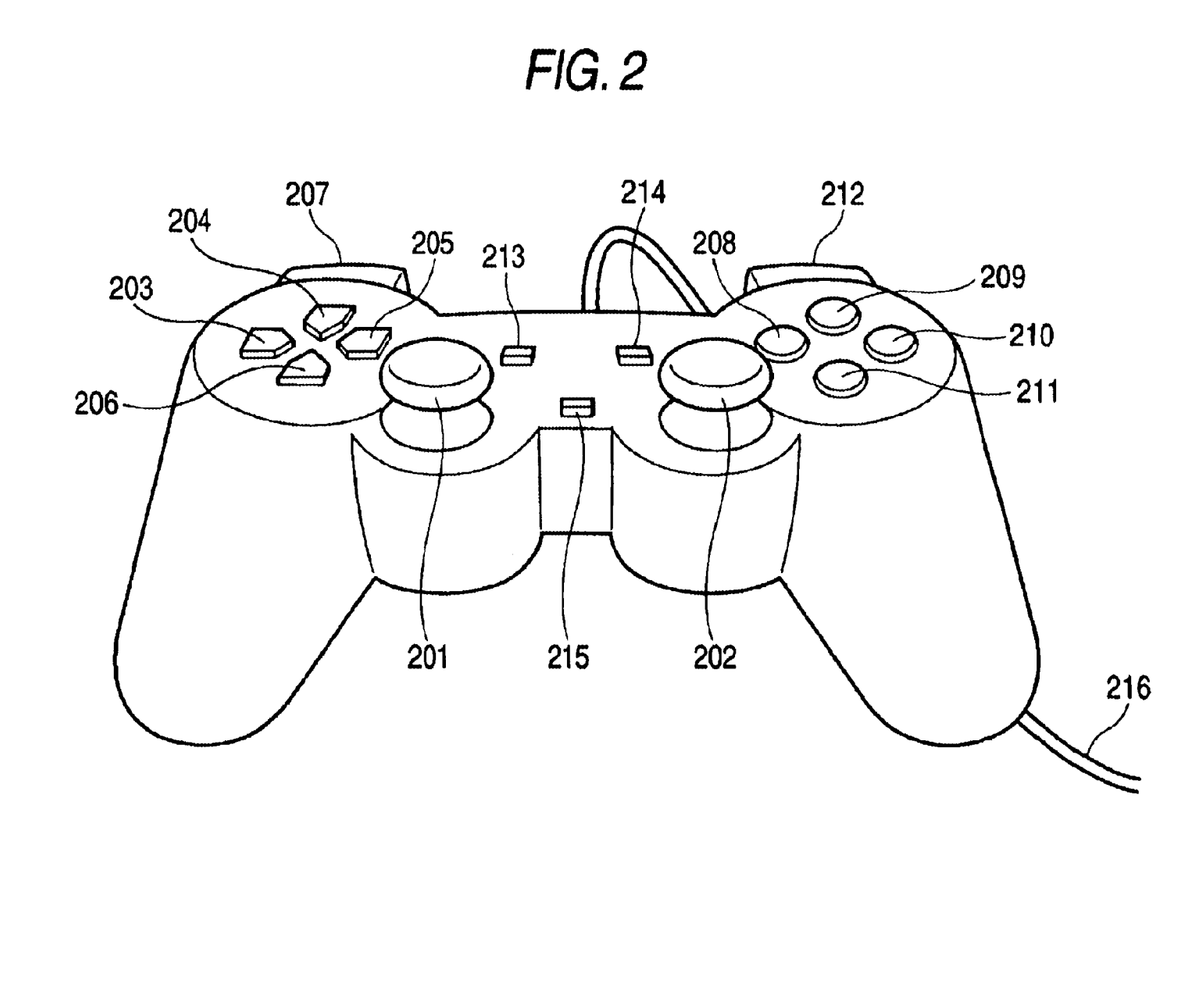
FIG. 2 is a perspective view for describing switches provided on a controller 152.
Figure 3:
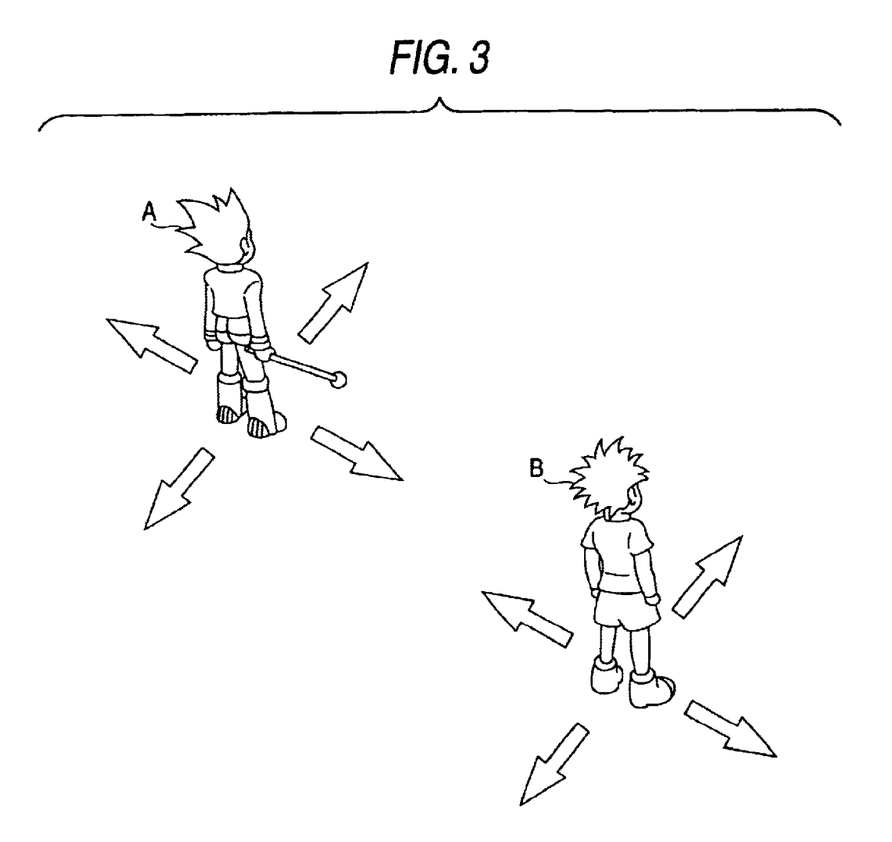
FIG. 3 is an illustration of a video game screen for describing a relationship between movement of a main character A and a sub-character B appearing on a screen and switches provided on the controller 152.

Turning to FIG. 2, the moving direction of the main character A is input by the orientation lever 201, and the moving direction of the sub-character B is input by the orientation lever 202. Switches 203 to 207 are assigned to manipulation of the main character A. Switches 208 to 212 are assigned to manipulation of the sub-character B.

As mentioned above, the sub-character B acts in accordance with the player's manipulation or a predetermined algorithm. In the following description, a state in which the sub-character B operates in accordance with the player's manipulation is called a manual operation mode of a video game program. On the other hand, a state in which the sub-character B operates in accordance with a predetermined algorithm is called an auto operation mode of the video game program. A process during which the video game program shifts from an auto operation mode to a manual operation mode will be described by reference to a flowchart shown in FIG. 4.

Figure 4:
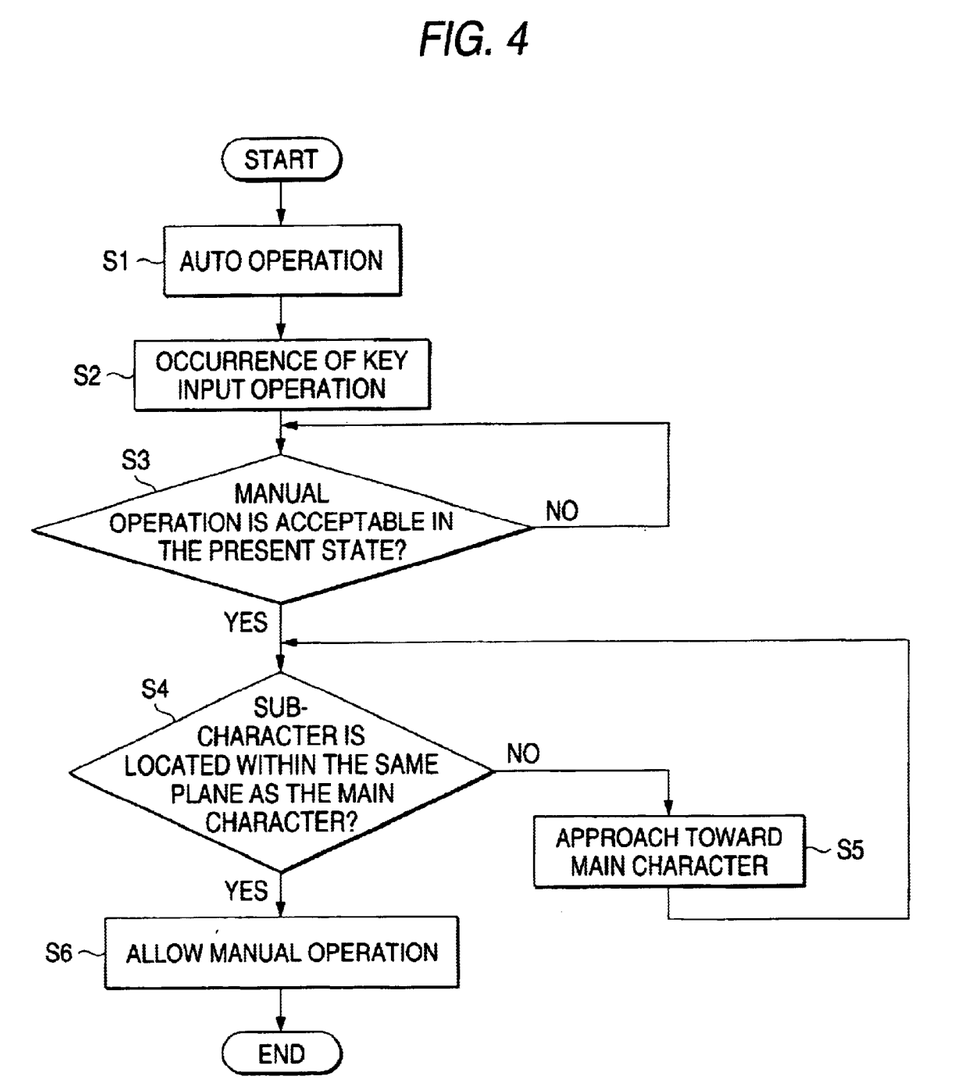
FIG. 4 is a flowchart for describing a course of switching being made from an auto operation mode to a manual operation mode.

In a period during which an input entered by way of any of the orientation lever 202 and the switches 206 and 207 is not detected, the sub-character B operates in an auto operation mode (step S1). In the auto operation mode, the sub-character B attacks an opponent character located at the closest position. For instance, the sub-character B attacks an opponent character C2.

During the course of an auto operation mode, when any one of the switches assigned to the sub-character B; that is, the orientation lever 202 and the switches 206 and 207, is subjected to an input action (step S2), the video game program checks whether or not a shift to a manual operation is now available (step S3) This check is for imposing a predetermined requirement on a shift from an auto operation mode to a manual operation mode. The check is made to represent in a video game a situation in which, for any reason, the sub-character B cannot follow an instruction entered by way of manual operation; for example, a frame in which the sub-character B is already engaging in battle with an opponent character and is performing attack and defense actions (e.g., is in the course of kicking the opponent with his feet), a frame in which the sub-character B cannot move because of severe injury, or a case where the action of the sub-character B is limited for reasons of a game system.

When it has been ascertained that a manual operation is acceptable, a positional relationship between the main character A and the sub-character B is verified (step S3). In order for the player to instruct the action of the sub-character B directly, the player needs to see the sub-character B. However, depending on the situation of the game, the sub-character B may be outside the screen. Therefore, when the sub-character B is not present on the screen, the player causes the main character B to approach the sub-character A (step S5). When the sub-character B is present in the screen, shift is made to the manual operation mode (step S6).

When shift has been made to the manual operation mode, the sub-character B acts in accordance with key input performed by the player. Shift is made from the manual operation mode to the auto operation mode when none of the orientation lever 202 and the switches 206 and 207 is subjected to input operation for a predetermined period of time.

Figure 5:
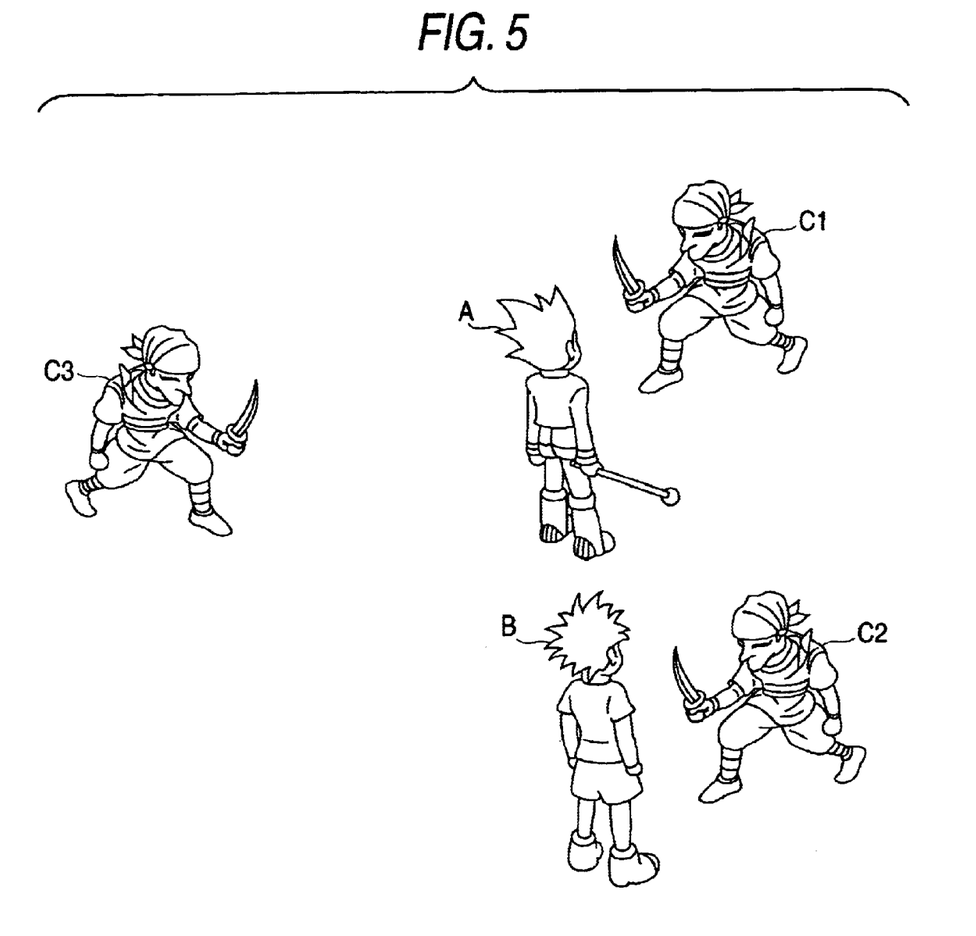
FIG. 5 is an illustration of a video game screen for describing a battle between a main character A, a sub-character B, and a plurality of opponent characters.

In the auto operation mode, the sub-character B attacks the closest opponent character. However, depending on the situation, the player may desire to change a target. For example, in the scenario shown in FIG. 5, an opponent character C3 is approaching the main character A, who is already engaging in battle with the opponent character C1. At this time, an object to be attacked by the sub-character B is originally an opponent character C2, and there maybe case where the player desires to prioritize elimination of the opponent character C3.

Figure 6:
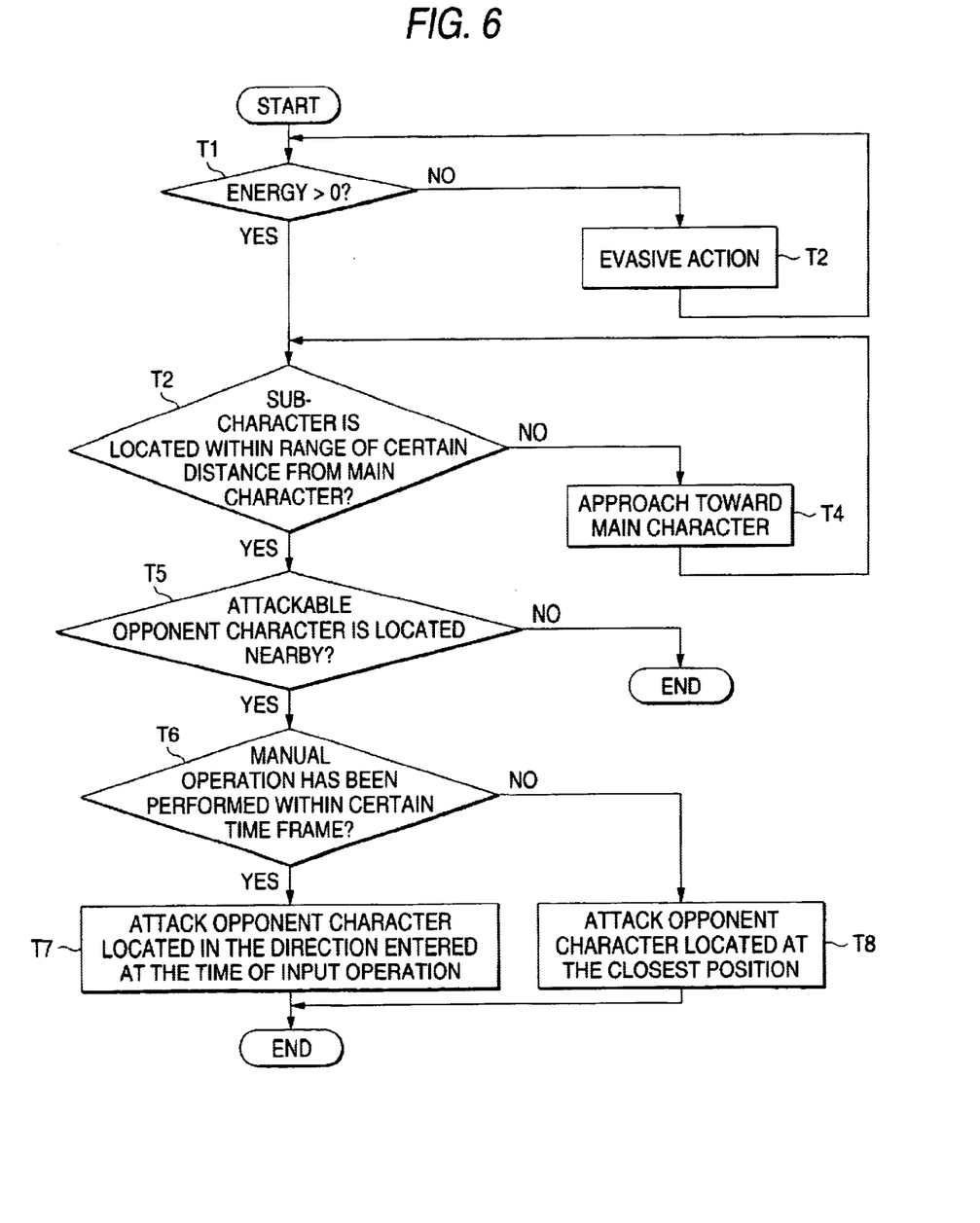
FIG. 6 is a flowchart for describing a process in which an opponent character to be taken as a target of the sub-character B is determined.

At this time, shift can made to a manual operation mode so that the player can guide the sub-character B to the opponent character C3. In this case, manipulation of the main character A is likely to be neglected. For this reason, in the video game according to the present invention, when an input operation is made to a certain extent in the manual operation mode, the sub-character B selects a desired opponent character as a target in a subsequent auto operation mode. With reference to FIG. 6, there will now be described a process in which the sub-character B selects a character to be attacked from among the opponent characters C1, C2, and C3 in the video game.

A numerical value which is incremented with lapse of time and is decremented when a character is attacked is set for the sub-character B. The sub-character B can perform attack when his energy has a positive value. When the energy of the sub-character B assumes a value of zero, the sub-character B can only attempt to evade attack from an opponent character. Therefore, a check is first made as to the magnitude of current energy of the sub-character B (step T1). If the energy of the sub-character B assumes a value of zero, the sub-character B performs evasive action (step T2).

Next, a distance between the main character A and the sub-character B is computed (step T3). When the main character A and the sub-character B are spaced apart from each other by a distance greater than a predetermined value, the sub-character B is caused to approach the main character A (step T4). On the other hand, when the main character A is present within a predetermined distance, an opponent in areas surrounding the sub-character B is searched (step T5). When no opponent character is present, attack is not performed, and processing is terminated.

When an opponent character is present around the main character B, a determination is made as to whether or not input has been made through the orientation lever 202 within a predetermined frame in the past (step T6). When input has been made, the opponent character, which is located in the entered direction at the time of input, is selected as a target (step T7). If no input has been made, an opponent character located closest to the sub-character B is selected as a target (step T8).

Selection of an opponent character is described by reference to a specific example. Assume that the main character A and the sub-character B are now in the situation shown in FIG. 5; namely, the main character A is engaging in battle with the opponent character C1, and the sub-character B is engaging in battle with the opponent character C2. Here, assume that the player attempts to cause the sub-character B to block the opponent character C3 approaching the main character A from the back. Energy of the sub-character B is positive, and the sub-character B is in a status in which he can perform action. The sub-character B is sufficiently close to the main character A.

Figure 7:
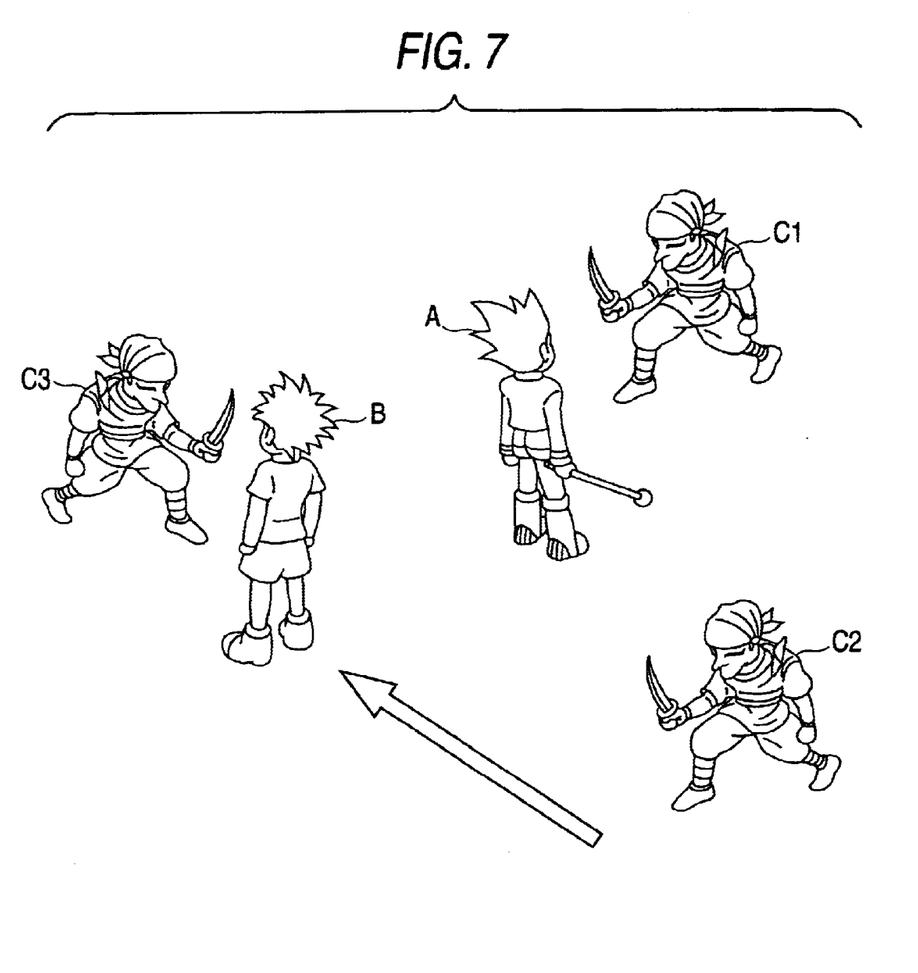
FIG. 7 is an illustration of a video game screen for describing a battle between the main character A, the sub-characters B, and a plurality of opponent characters.

At the beginning, the sub-character B handles the closest opponent character as a target (step T8). Here, the player momentarily tilts the orientation lever 202 toward the opponent character C3 (step S1). Shift is made to a manual operation mode after completion of an animation pertaining to attack/defense actions of the sub-character B (step S2). The opponent character C3 located in the direction in which the orientation lever 202 has been tilted is set as a target. Here, the sub-character B has positive energy (step T1) and is located sufficiently close to the main character A (step T3). Opponent characters C1, C2, and C3 are present as opponent characters which the sub-character B can attack (step T5). Therefore, determination is made that a manual operation was performed immediately before (step T6) that is, the manual operation is available. The sub-character B changes a target and makes movement in the manner as shown in FIG. 7, thus attacking the opponent character C3.

Figure 8:
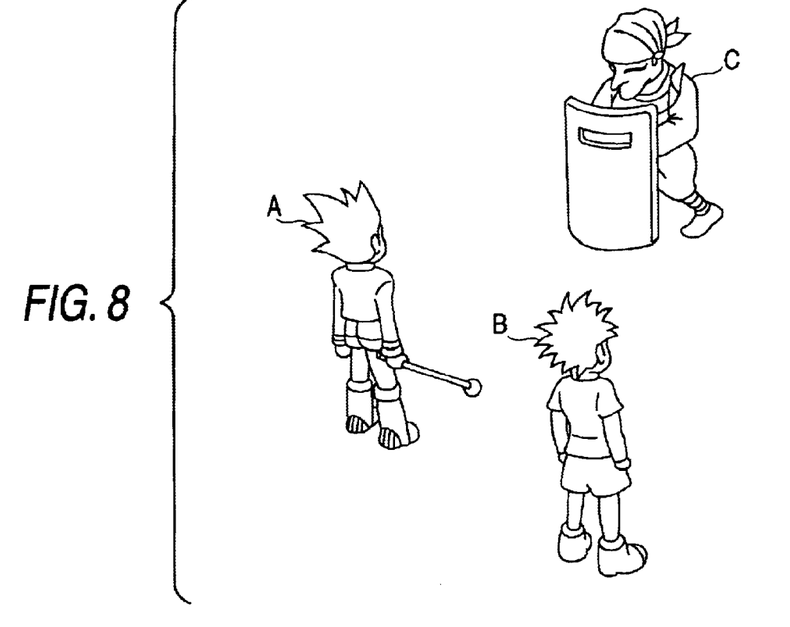
FIG. 8 is an illustration of a video game screen for describing a battle between the main character A, the sub-characters B, and an opponent character which completely blocks attack in one direction.
Figure 9:
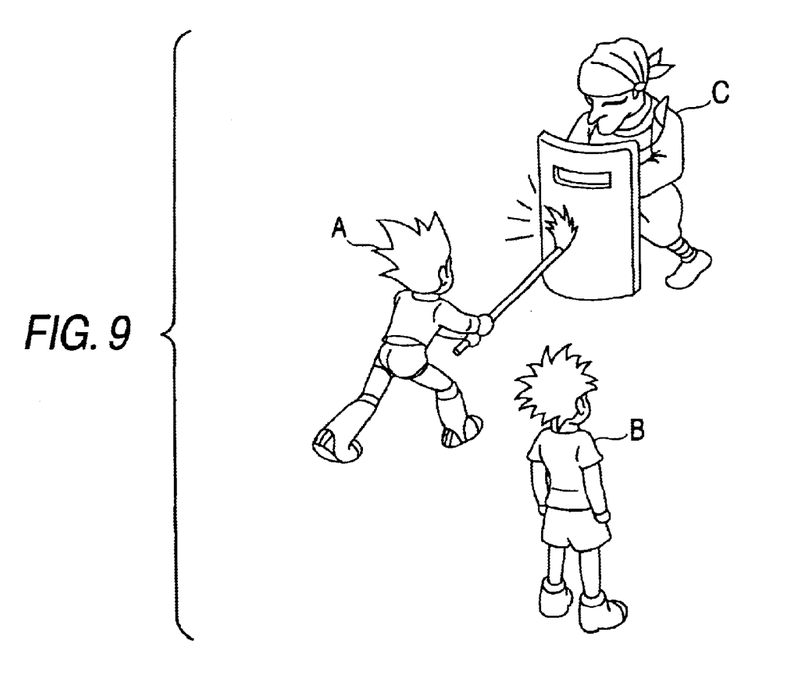
FIG. 9 is an illustration of a video game screen for describing a battle between the main character A, the sub-characters B, and an opponent character which completely blocks attack in one direction.
Figure 10:
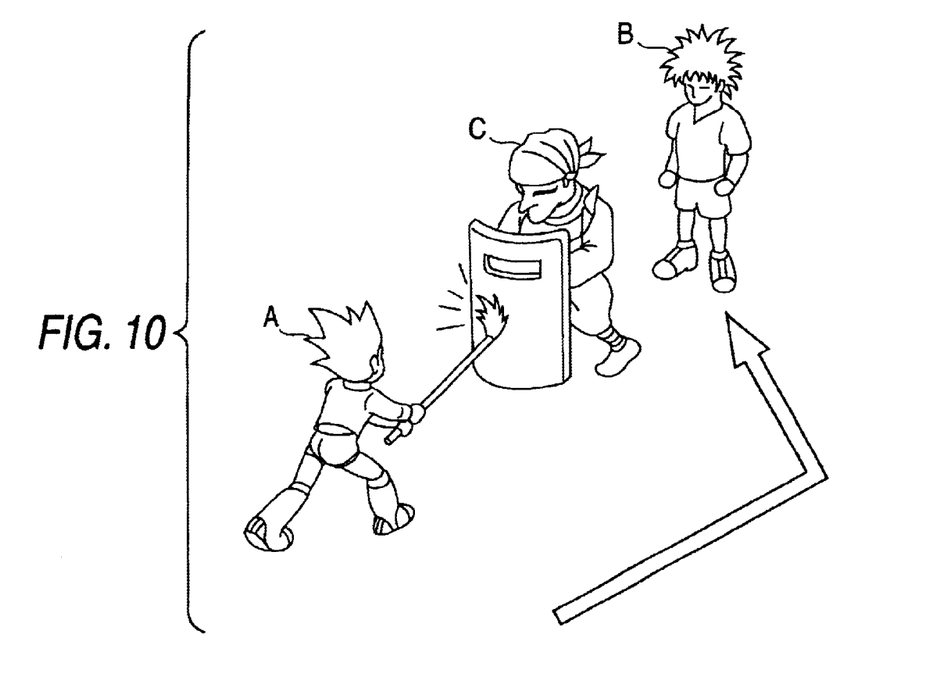
FIG. 10 is an illustration of a video game screen for describing a battle between the main character A, the sub-characters B, and an opponent character which completely blocks attack in one direction.
Figure 11:
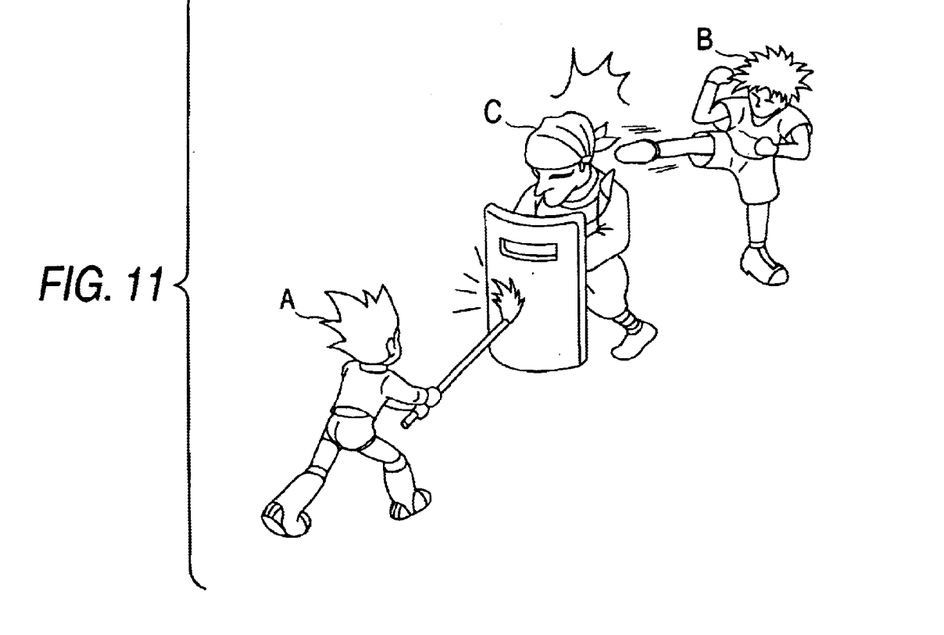
FIG. 11 is an illustration of a video game screen for describing a battle between the main character A, the sub-characters B, and an opponent character which completely blocks attack in one direction.

The above example has described a situation in which a video game according to the present invention can be represented, by taking as subject matter a battle between a plurality of player characters and a plurality of opponent characters. The next example pertains to a battle between a plurality of player characters and a single opponent character (FIG. 8). The opponent character C has a characteristic of completely preventing a frontal attack and being not susceptible to damage at all (FIG. 9). For this reason, the main character A cannot defeat the opponent character C. At this time, in order to defeat the opponent, the player move the sub-character B in the direction designated by the arrow B shown in FIG. 10 in a manual operation mode while causing the main character A to continually attack. By this action, the sub-character B can impart damage to the opponent character C (FIG. 11).

There is described an example of a challenge (problem) which can be solved by simultaneous operation of a plurality of player characters. Floors D1 and D2 shown in FIG. 12 act as switches. When a player character steps on the switch, the switch is turned on. When the player steps off the switch, the switch is turned off. The switches D1 and D2 are designed so as to operate in association with opening and closing actions of a door. The door is designed to open only when both switches D1 and D2 are turned on simultaneously.

Figure 12:
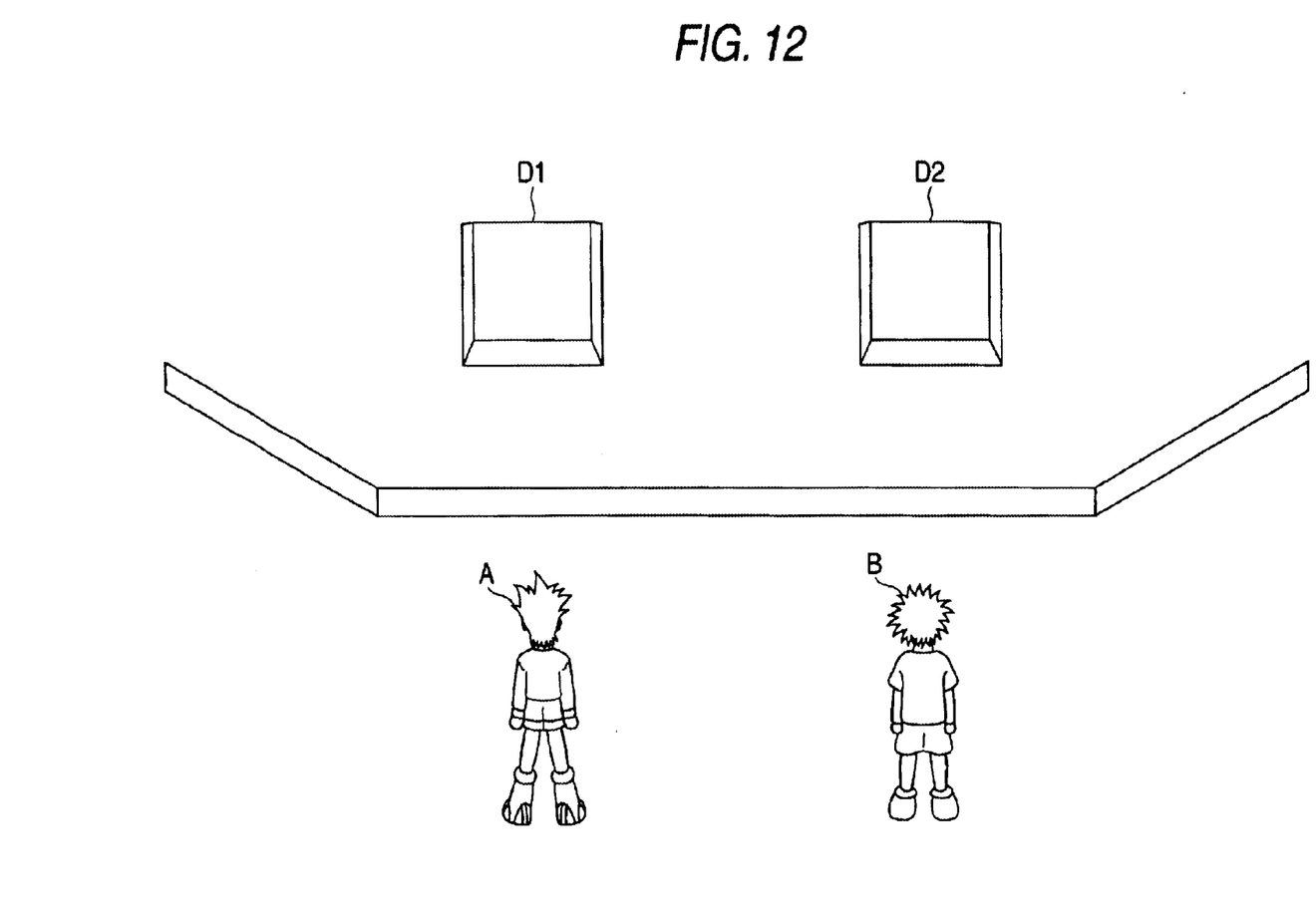
FIG. 12 is an illustration of a video game screen for describing an example of a challenge which can be met by means of simultaneously manipulation of the main character A and the sub-characters B.
Figure 13:
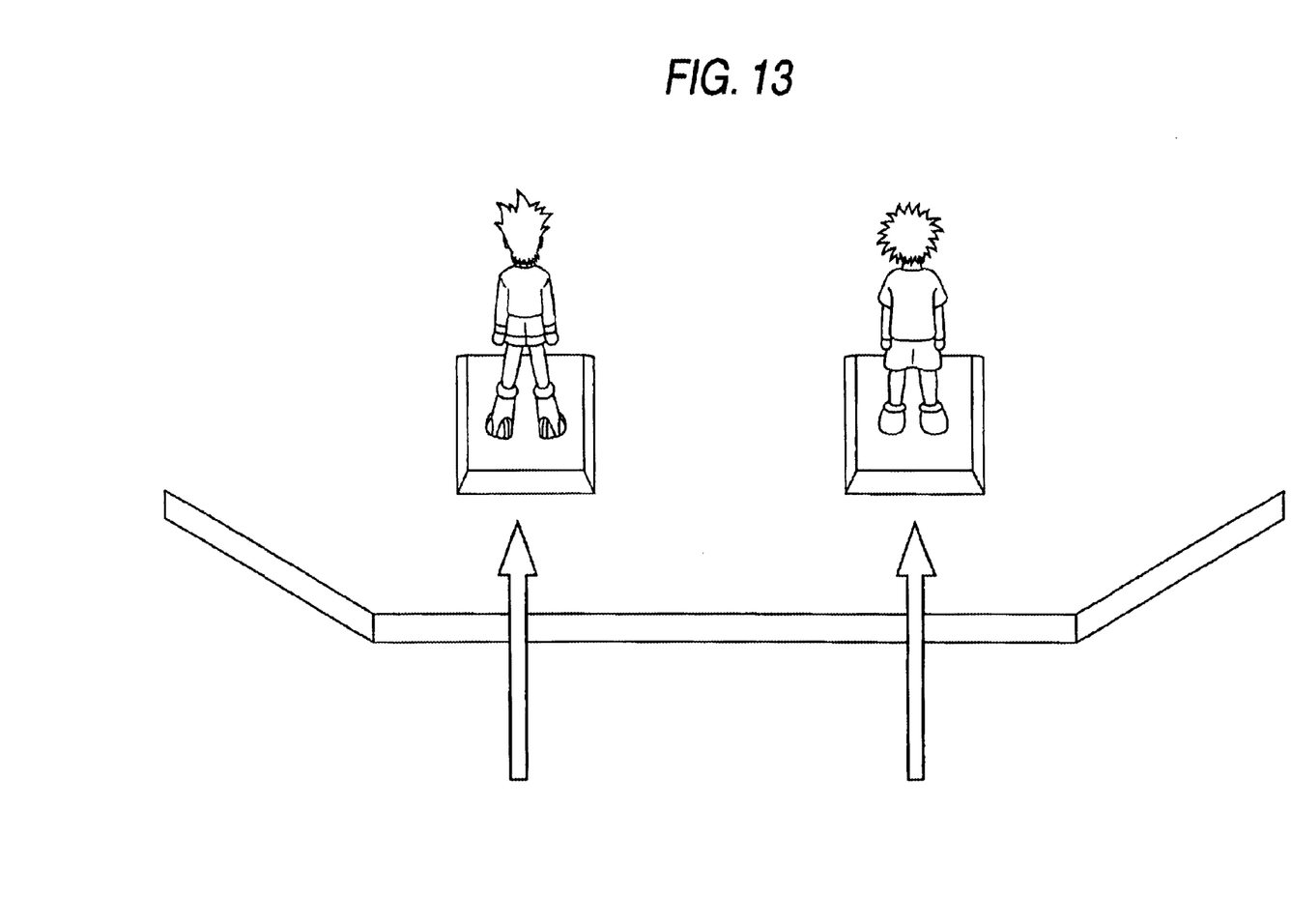
FIG. 13 is an illustration of a video game screen for describing an example of a challenge which can be met by means of simultaneously manipulation of the main character A and the sub-characters B.

In order to open the door in a state shown in FIG. 12, the player tilts the orientation levers 201 and 202 forward, thus causing the main character A to step on the floor D1 and the sub-character B to step on the floor D2.

Here, in addition to reference to turning on/off of the floors D1 and D2, the switches D1 and D2 being turned on simultaneously may be added to requirements for opening the door. In this case, a difficulty level of operation required for playing a game can be increased.

The present invention has been described on the basis of the embodiment; however, the present invention is not limited thereto. As a matter of course, the present invention is susceptible to modification and improvement within the range of ordinary knowledge of those of ordinary skill in the art.

For instance, two or more sub-characters B maybe employed. In order to cause two sub-characters B to emerge, there is a conceivable method of entering a direction for the main character A by combination of four inputs entered by way of the switches 203 to 206, as well as of assigning sub-characters B to the orientation levers 201 and 202.

The present invention is described with reference to an example in which player characters battle with non-player characters. The present invention can be applied to a system by way of which a plurality of players cause player characters to battle with each other.

A video game program and a video game machine according to the present invention are provided with different orientation input means assigned to respective player characters. To switch operation modes of a player character having a plurality of operation modes, switches assigned to the player character are operated in their present forms. Therefore, there is no necessity for the player to perform special operation for only switching purpose. Hence, the player can manipulate the sub-character without consideration of switching between operation modes.

Since the video game program and the video game machine according to the present invention enable simultaneous manipulation of a plurality of player characters, a challenge—which can be met only when a plurality of player characters are manipulated simultaneously—can be set in a game.

According to the video game program and video game machine of the present invention, so long as a target is specified in a manual operation mode, a sub-character automatically takes a specified opponent character as a target. Hence, semi-automatic control of the sub-character can be effected.

What is claimed is:
1. A video game machine comprising:
   a controller provided with a plurality of switches including a plurality of orientation input means;
   means for simultaneously displaying a plurality of player characters; and
   means of assigning switches including at least one of the orientation input means to the respective player characters,
   wherein at least one of the plurality of player characters has a first mode in which the player character operates in accordance with input made by the switches assigned to the player character, and a second mode in which the player character operates in accordance with a predetermined sub-program, and wherein switching between the first and second modes is effected when input operation, by any one of switches assigned to the player characters, is performed.

2. The video game machine according to claim 1, wherein the sub-program takes, as an object of action, a non-player character located at a position closest to the player character which is an object of control.

3. The video game machine according to claim 1, wherein in the first mode, a non-player character located in a direction which is entered by the orientation input means assigned to the player character is detected, and in the second mode, the detected non-player character is taken as an object of action for the player character.

4. The video game machine according to claim 1, wherein a non-player character takes one of the plurality of player characters located closest to the non-player character as an object of action.

5. The video game machine according to claim 2, wherein the action includes one of approaching action, battle action and conversation of the non-player character.

6. The video game machine according to claim 1, wherein at least one of the plurality of player characters acts in accordance with only an input entered by the assigned switches.

7. The video game machine according to claim 1, wherein a non-player character completely prevents attack in one direction.

8. The video game machine according to claim 1, wherein a plurality of switches which are to be actuated by the player character are provided, and when the plurality of player characters simultaneously actuates the plurality of switches, a predetermined response is performed.

9. The video game machine according to claim 8, wherein the plurality of switches includes a plurality of switches which are turned on when the player characters step on the switches.

10. A method of controlling action of a player character which appears in a video game program to be executed by a video game machine which enables connection of a controller having a plurality of orientation input means, the method comprising the steps of:

simultaneously displaying a plurality of player characters; and assigning switches including at least one of the orientation input means to the respective player characters, wherein at least one of the plurality of player characters has a first mode in which the player character operates in accordance with inputs made by the switches assigned to the player character, and a second mode in which the player character operates in accordance with a predetermined sub-program; and switching the first and second modes when input operation by way of any one of switches assigned to the player character is performed.

11. A video game program product to be executed by a video game machine which enables connection of a controller having a plurality of orientation input means, the method comprising the steps of:

simultaneously displaying a plurality of player characters; and assigning switches including at least one of the orientation input means to the respective player characters, wherein at least one of the plurality of player characters has a first mode in which the player character operates in accordance with inputs made by the switches assigned to the player character, and a second mode in which the player character operates in accordance with a predetermined sub-program; and switching between the first and second modes when input operation is performed by any one of switches assigned to the player characters.

12. The video game program product according to claim 11, wherein the sub-program takes, as an object of action, a non-player character located at a position closest to the player character which is an object of control.

13. The video game program product according to claim 11, wherein in the first mode, a non-player character located in a direction which is entered by the orientation input means assigned to the player character is detected, and in the second mode, the detected non-player character is taken as an object of action for the player character.

14. The video game program product according to claim 11, wherein a non-player character takes one of the player characters located closest to the non-player character as an object of action.

15. The video game program product according to claim 12, wherein the action includes one of approaching action, battle action and conversation of the non-player character.

16. The video game program product according to claim 11, wherein at least one of the plurality of player characters acts in accordance with only an input entered by the assigned switches.

17. The video game program product according to claim 11, wherein a non-player character completely prevents attack in one direction.

18. The video game program product according to claim 11, wherein a plurality of switches which are to be actuated by the player character are provided, and when the plurality of player characters simultaneously actuates the plurality of switches, a predetermined response is performed.

19. The video game program product according to claim 18, wherein the plurality of switches includes a plurality of switches which are turned on when the player characters step on the switches.

20. A video game machine which operates in accordance with the video game program product as defined in any one of claims 11 through 19.

21. The video game machine according to claim 20, further comprising a controller having a plurality of orientation input means.

* * * * *